United States Patent
Bertagnolli et al.

(10) Patent No.: US 8,342,269 B1
(45) Date of Patent: *Jan. 1, 2013

(54) POLYCRYSTALLINE DIAMOND COMPACT (PDC) CUTTING ELEMENT HAVING MULTIPLE CATALYTIC ELEMENTS

(75) Inventors: Kenneth E. Bertagnolli, Sandy, UT (US); Michael A. Vail, Genola, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/284,713

(22) Filed: Oct. 28, 2011

Related U.S. Application Data (63) Continuation of application No. 13/093,572, filed on Apr. 25, 2011, now Pat. No. 8,061,458, which is a continuation of application No. 12/614,330, filed on Nov. 6, 2009, now Pat. No. 7,950,477, which is a continuation of application No. 11/210,292, filed on Aug. 24, 2005, now Pat. No. 7,635,035.

(51) Int. Cl.
   *B32B 9/00* (2006.01)
(52) U.S. Cl. ............... 175/434; 51/309; 407/119
(58) Field of Classification Search ............ 175/434; 51/307; 407/119
   See application file for complete search history.

(56) References Cited

U.S. PATENT DOCUMENTS

| | | |
|---|---|---|
| 3,745,623 A | 7/1973 | Wentorf, Jr. et al. |
| 4,224,380 A | 9/1980 | Bovenkerk et al. |
| 4,268,276 A | 5/1981 | Bovenkerk |
| 4,274,900 A | 6/1981 | Mueller et al. |
| 4,311,490 A | 1/1982 | Bovenkerk et al. |
| 4,333,986 A | 6/1982 | Tsuji et al. |
| 4,410,054 A | 10/1983 | Nagal et al. |
| 4,468,138 A | 8/1984 | Nagel |
| 4,518,659 A | 5/1985 | Gigl et al. |
| 4,525,179 A | 6/1985 | Gigl |
| 4,556,403 A | 12/1985 | Almond et al. |
| 4,560,014 A | 12/1985 | Geczy |
| 4,629,373 A | 12/1986 | Hall |
| 4,664,705 A | 5/1987 | Horton et al. |
| 4,694,918 A | 9/1987 | Hall |
| 4,738,322 A | 4/1988 | Hall et al. |
| 4,738,689 A * | 4/1988 | Gigl et al. .................. 51/295 |
| 4,798,026 A | 1/1989 | Cerceau |
| 4,811,801 A | 3/1989 | Salesky et al. |
| 4,871,377 A | 10/1989 | Frushour |
| 4,874,398 A | 10/1989 | Ringwood |
| 4,906,528 A | 3/1990 | Cerceau et al. |

(Continued)

OTHER PUBLICATIONS

Akaishi et al. "High Pressure Synthesis of Diamond in the Systems of Graphite-Sulfate and Graphite-Hydroxide," Japan Journal of Applied Physics, vol. 29, No. 7 (Jul. 1990), pp. L 1172-L 1174.

(Continued)

*Primary Examiner* — William P Neuder
(74) *Attorney, Agent, or Firm* — Holland & Hart, LLP (57) ABSTRACT

A polycrystalline diamond compact useful for wear, cutting, drilling, drawing and like applications is provided with a first diamond region remote from the working surface which has a metallic catalyzing material and a second diamond region adjacent to or including the working surface containing a non-metallic catalyst and the method of making such a compact is provided. This compact is particularly useful in high temperature operations, such as hard rock drilling because of the improved thermal stability at the working surface.

32 Claims, 4 Drawing Sheets

U.S. PATENT DOCUMENTS

| | | | |
|---|---|---|---|
| 4,907,377 A * | 3/1990 | Csillag et al. ............... | 51/309 |
| 4,913,247 A | 4/1990 | Jones | |
| 4,948,388 A | 8/1990 | Ringwood | |
| 4,985,051 A | 1/1991 | Ringwood | |
| 5,009,673 A | 4/1991 | Cho | |
| 5,011,509 A | 4/1991 | Frushour | |
| 5,011,514 A | 4/1991 | Cho et al. | |
| 5,016,718 A | 5/1991 | Tandberg | |
| 5,092,687 A | 3/1992 | Hall | |
| 5,120,327 A | 6/1992 | Dennis | |
| 5,127,923 A | 7/1992 | Bunting et al. | |
| 5,135,061 A | 8/1992 | Newton, Jr. | |
| 5,151,107 A | 9/1992 | Cho et al. | |
| 5,154,245 A | 10/1992 | Waldenstrom et al. | |
| 5,180,022 A | 1/1993 | Brady | |
| 5,266,236 A | 11/1993 | Bovenkerk | |
| 5,273,557 A | 12/1993 | Cerutti et al. | |
| 5,304,342 A | 4/1994 | Hall, Jr. et al. | |
| 5,351,772 A | 10/1994 | Smith | |
| 5,364,192 A | 11/1994 | Damm et al. | |
| 5,368,398 A | 11/1994 | Damm et al. | |
| 5,370,195 A | 12/1994 | Keshavan et al. | |
| 5,435,403 A | 7/1995 | Tibbitts | |
| 5,460,233 A | 10/1995 | Meany et al. | |
| 5,480,233 A | 1/1996 | Cunningham | |
| 5,544,713 A | 8/1996 | Dennis | |
| 5,590,729 A | 1/1997 | Cooley et al. | |
| 5,605,198 A | 2/1997 | Tibbitts et al. | |
| 5,624,756 A | 4/1997 | Ueda et al. | |
| 5,769,176 A | 6/1998 | Sumiya et al. | |
| 5,787,022 A | 7/1998 | Tibbitts et al. | |
| 5,912,217 A | 6/1999 | Sumiya et al. | |
| 5,950,747 A | 9/1999 | Tibbitts et al. | |
| 5,967,249 A | 10/1999 | Butcher | |
| 6,021,859 A | 2/2000 | Tibbitts et al. | |
| 6,068,913 A | 5/2000 | Cho et al. | |
| 6,245,312 B1 | 6/2001 | Blank et al. | |
| 6,248,447 B1 | 6/2001 | Griffin et al. | |
| 6,315,065 B1 | 11/2001 | Yong et al. | |
| 6,344,149 B1 | 2/2002 | Oles | |
| 6,401,844 B1 | 6/2002 | Doster et al. | |
| 6,410,085 B1 | 6/2002 | Griffin et al. | |
| 6,435,058 B1 | 8/2002 | Matthias et al. | |
| 6,443,248 B2 | 9/2002 | Yong et al. | |
| 6,481,511 B2 | 11/2002 | Matthias et al. | |
| 6,544,308 B2 | 4/2003 | Griffin et al. | |
| 6,562,462 B2 | 5/2003 | Griffin et al. | |
| 6,585,064 B2 | 7/2003 | Griffin et al. | |
| 6,589,640 B2 | 7/2003 | Griffin et al. | |
| 6,592,985 B2 | 7/2003 | Griffin et al. | |
| 6,601,662 B2 | 8/2003 | Matthias et al. | |
| 6,739,214 B2 | 5/2004 | Griffin et al. | |
| 6,749,033 B2 | 6/2004 | Griffin et al. | |
| 6,793,681 B1 | 9/2004 | Pope et al. | |
| 6,861,098 B2 | 3/2005 | Griffin et al. | |
| 6,861,137 B2 | 3/2005 | Griffin et al. | |
| 6,878,447 B2 | 4/2005 | Griffin et al. | |
| 6,913,633 B2 | 7/2005 | Fries et al. | |
| 7,261,753 B2 | 8/2007 | Yamamoto et al. | |
| 7,621,974 B2 | 11/2009 | Yamamoto et al. | |
| 7,628,234 B2 | 12/2009 | Middlemiss | |
| 7,635,035 B1 * | 12/2009 | Bertagnolli et al. .......... | 175/434 |
| 7,845,438 B1 | 12/2010 | Vail et al. | |
| 7,918,293 B1 | 4/2011 | Vail | |
| 7,950,477 B1 * | 5/2011 | Bertagnolli et al. .......... | 175/434 |
| 8,061,458 B1 * | 11/2011 | Bertagnolli et al. .......... | 175/434 |
| 2004/0060243 A1 | 4/2004 | Fries et al. | |
| 2005/0019114 A1 | 1/2005 | Sung | |
| 2005/0044800 A1 | 3/2005 | Hall et al. | |
| 2005/0076897 A1 | 4/2005 | Yoshida et al. | |
| 2007/0079994 A1 | 4/2007 | Middlemiss | |
| 2007/0193782 A1 | 8/2007 | Fang et al. | |
| 2008/0011522 A1 | 1/2008 | Hall et al. | |
| 2008/0057145 A1 | 3/2008 | Hall et al. | |
| 2008/0085407 A1 | 4/2008 | Cooley et al. | |
| 2008/0099250 A1 | 5/2008 | Hall et al. | |
| 2008/0115421 A1 | 5/2008 | Sani | |
| 2008/0223623 A1 | 9/2008 | Keshavan et al. | |
| 2008/0314647 A1 | 12/2008 | Hall et al. | |
| 2009/0260895 A1 | 10/2009 | Vail et al. | |

OTHER PUBLICATIONS

Akaishi et al., "Synthesis of Diamond from Graphite-Carbonate Systems Under Very High Temperature and Pressure," Journal of Crystal Growth 104: 578-581 (1990).

Akaishi et al., "Phosphorous: An Elemental Catalyst for Diamond Synthesis and Growth," Science 259: 1592-1593 (1993).

Minoru Akaishi, Shinobu Yamaoka, Fumihiro Ueda and Tadakazu Ohashi, "Synthesis of Polycrystalline Diamond Compact with Magnesium Carbonate and its Physical Properties," Diamond and Related Materials 5 (1996) pp. 2-7.

Minoru Akaishi and Shinobu Yamaoka, "Physical and Chemical Properties of the Heat Resistant Diamond Compacts From Diamond-Magnesium Carbonate System," Materials Science and Engineering A209 (1996) pp. 54-59.

H.P. Bovenkerk, F.P. Bundy, R.M. Chrenko, P.J. Codella, H.M. Strong and R.H. Wentorf Jr., "Errors in Diamond Synthesis," Nature, vol. 365, Sep. 2, 1993 p. 19.

Bundy et al., "Man-Made Diamonds," General Electric Research Laboratory (7 pages), reprinted from Nature, vol. 176 (Jul. 1955), p. 51-56.

Bovenkerk et al., "Preparation of Diamond," reprinted from Nature, vol. 184 (Oct. 1959), pp. 1094-1098.

V.A. Davydov, A.V. Rakhmanina, V. Agafonov, B. Narymbetov, J.-P. Boudou and H. Szwarc, "Conversion of Polycyclic Aromatic Hydrocarbons to Graphite and Diamond at High Pressures," Carbon 42 (2004) pp. 261-269.

Ekimov et al., "Sintering of Diamond in the Presence of WO3," Inorganic Materials, vol. 40, No. 6 (2004), pp. 595-599.

Ekimov et al., "Synthesis of Polycrystalline Diamond in the Boron Carbide-Graphite and Boron-Graphite Systems Under High Pressure and Temperature," Journal of Materials Science, vol. 39 (2004), pp. 4957-4960.

Hong et al., "High-Pressure Synthesis of Heat-Resistant Diamond Composite Using a Diamond-TiC 0.6 Powder Mixture," Journal of the American Ceramic Society, vol. 82, No. 9 (1999), pp. 2497-2501.

S.M. Hong, M. Akaishi and S. Yamaoka, "Nucleation of Diamond in the System of Carbon and Water Under Very High Pressure and Temperature," Journal of Crystal Growth 200 (1999) pp. 326-328.

Kanda et al., "New Catalysts for Diamond Growth Under High Pressure and High Temperature," Applied Physics Letters, vol. 65 (1994), pp. 784-786.

Hisao Kanda, Minoru Akaishi and Shinobu Yamaoka, "New Catalysts for Diamond Growth Under High Pressure and High Temperature," Appl. Phys. Lett. 65 (6) (Aug. 8, 1994), pp. 784-786.

Lin, Jerry Y.S., (2003), "Novel Inorganic Membranes for High Temperature Carbon Dioxide Separation," Final Technical Report; University of Cincinnati, Department of Chemical Engineering; pp. 1-9.

Linin, Y.A. (2003) Alkaline-Chloride Components in Processes of Diamond Growth in the Mantle and High-Pressure Experimental Conditions. Doklady Earth Science 389 (3), 338-391.

K. Sato and T. Katsura, "Sulfur: A New Solvent-Catalyst for Diamond Synthesis Under High-Pressure and High-Temperature Conditions," Journal of Crystal Growth 223 (2001) pp. 189-194.

Shushkanova, A.V., et al., "Diamond Formation in Sulfide Pyrrhotite-Carbon Melts: Experiments at 6.0-7.1 GPa and Application to Natural Conditions," Geochemistry International, vol. 46, No. 1, pp. 37-47, 2008.

Shushkanova, A.V., et al., "Formation of Diamond Polycrystals in Pyrrhotite-Carabonic Melt: Experiments at 6.7 GPa," Doklady Earth Sciences, vol. 409A, No. 6, pp. 916-920, 2006.

S.K. Singhal and H. Kanda, "Temperature Dependence of Growth of Diamond from a Cu-C System Under High Pressure," Journal of Crystal Growth 154 (1995) pp. 297-302.

Sumiya et al., "Synthesis of Polycrystalline Diamond with New Non-Metallic Catalyst Under High Pressure and High Temperature," International Journal of Refractory Metals & Hard Materials, vol. 17 (1999), pp. 345-350.

Tomlinson et al., "High-Pressure Experimental Growth of Diamond Using C-K2C03-Kcl as an Analogue for Cl-Bearing Carbonate Fluid," Lithos, vol. 77 (2004), pp. 287-294.

U.S. Appl. No. 12/495,986, by Bertagnolli et al., filed Jul. 1, 2009, for Polycrystalline Diamond Compact Including a Presintered Polycrystalline Diamond Table Including a Nonmetallic Catalyst That Limits Infiltration of a Metallic-Catalyst Infiltrant Therein and Applications Therefor.

U.S. Appl. No. 12/185,457, by Vail et al., filed Aug. 4, 2008, for Methods of Fabricating Polycrystalline Diamond With a Carbonate Material Including at Least One Alkali Metal Carbonate, Polycrystalline Diamond So-Formed, and Applications Therefor.

Vul' et al., "Fullerenes Catalyze the Graphite-Diamond Phase Transition," Technical Physics Letters, vol. 27, No. 5 (2001), pp. 384-386.

Wakatsuki, M., "New Catalysts for Synthesis of Diamond," Japan Journal of Applied Physics, vol. 5, (1966), p. 337.

Yamasaki, Nakamichi, et al., "Synthesis of Diamond Particles Under Alkaline Hydrothermal Conditions," Solid State Phenomena, vol. 114, pp. 271-276, Jul. 2006.

Yanbin Wang, Ivan G. Getting, Donald J. Weidner and Michael T. Vaughan, "Performance of Tapered Anvils in a DIA-Type, Cubic-Anvil, High Pressure Apparatus for X Ray Diffraction Studies," Properties of Earth and Planetary Materials at High Pressure and Temperature Geophysical Monograph 101, 1998 pp. 35-39.

Y. Wang and H. Kanda, "Growth of HPHT Diamonds in Alkali Halides: Possible Effects of Oxygen Contamination," Diamond and Related Materials 7 (1998) pp. 57-63.

* cited by examiner

POLYCRYSTALLINE DIAMOND COMPACT (PDC) CUTTING ELEMENT HAVING MULTIPLE CATALYTIC ELEMENTS

CROSS-REFERENCE TO RELATED APPLICATIONS

This application is a continuation of U.S. patent application Ser. No. 13/093,572, filed Apr. 25, 2011, now U.S. Pat. No. 8,061,458, entitled POLYCRYSTALLINE DIAMOND COMPACT (PDC) CUTTING ELEMENT HAVING MULTIPLE CATALYTIC ELEMENTS, which is a continuation of U.S. patent application Ser. No. 12/614,330 filed Nov. 6, 2009, now U.S. Pat. No. 7,950,477, entitled POLYCRYSTALLINE DIAMOND COMPACT (PDC) CUTTING ELEMENT HAVING MULTIPLE CATALYTIC ELEMENTS, which is a continuation of U.S. patent application Ser. No. 11/210,292 filed Aug. 24, 2005, now U.S. Pat. No. 7,635,035, entitled POLYCRYSTALLINE DIAMOND COMPACT (PDC) CUTTING ELEMENT HAVING MULTIPLE CATALYTIC ELEMENTS, the disclosures of each of which are incorporated by reference herein in their entireties.

BACKGROUND OF THE INVENTION

1. Field of the Invention

This invention relates to superhard polycrystalline cutting elements used for wear, drawing and other tool applications where superhard properties are useful. More specifically, this invention relates to such superhard polycrystalline cutting elements that make use of polycrystalline diamond regions for the cutting or wear surface.

2. Description of Related Art

A wide variety of polycrystalline diamond compacts (PDC) are well known in the art. Generally, these prior devices do not incorporate a thermally stable catalytic element in the region adjacent to the cutting surface, that therefore prior PDC devices tend to have a mismatch in thermal expansion that can cause the interstitial metal to exert a high stress on the diamond lattice, which in turn can lead to fracture of the diamond-to-diamond bonds and subsequent premature failure of the compact. Further, prior PDC devices tend to incorporate a non-thermally stable catalytic element that readily dissolves carbon from the diamond surface at elevated temperatures, thereby, leading to the conversion of diamond to graphite, which in turn leads to premature failure of the compact.

Common PDCs are formed by subjecting diamond or other superhard particles (such as Cubic Boron Nitride (CBN) and the like) to high-temperatures and high pressure in the presence of a metallic catalyst to form a polycrystalline matrix of inter-bonded particles. This bonding process is typically referred to as "sintering." The metallic catalyst typically remains in the polycrystalline diamond matrix, although some PDCs have used leaching to remove some or all of the catalyst. Well known PolyCrystalline Diamond (PCD) elements typically consist of a facing table of polycrystalline diamond integrally bonded to a substrate of a less hard material, such as cemented tungsten carbide. This material is often referred to as a Polycrystalline Diamond Compact (PDC). PDC is commonly used in down hole tools; such as drill bits (including drag bits, also called fixed cutter bits; percussion bits; rolling cone bits, also called rock bits), reamers, stabilizers and tool joints.

Thermal stability in a PDC has become known as important for its relationship to the successful use of the compact's use in hard rock drilling applications. High temperatures are generated at the leading edge of the PDC tool while cutting rock. These high temperatures can cause premature failure of the tool via several mechanisms, two of which are graphitization of the polycrystalline diamond in contact with the interstitial metallic catalyst and thermal expansion of the interstitial metallic catalyst. In the graphitization mechanism, carbon is readily dissolved from the diamond surface as the temperature of the cutting tip increases above about 450° C. This dissolving of the carbon is due to the increased saturation level of carbon in the metallic catalyst with increasing temperature. The dissolved carbon takes the form of graphite since the PCD tool operates outside of the thermodynamic stability region of diamond. In the thermal expansion mechanism, this thermal expansion of the metallic catalyst is several times greater than that of diamond for a given increase in temperature. The mismatch in thermal expansion causes the interstitial metal to exert a high stress on the diamond lattice. These stresses can lead to a fracture of diamond-to-diamond bonds at or above about 700° C. and subsequent premature failure of the compact.

The most common method of improving the thermal stability of PDC is to fully or partially remove the metallic catalyst from the diamond lattice. Some of the following listed references disclose this technique in some detail. Material with the metallic catalyst removed from the entire sintered diamond body is commonly known as Thermally Stable Polycrystalline (TSP) diamond.

Although the following references may not necessarily qualify as "prior art," the reader is referred to these following U.S. Patent documents for general background material. Each of these patent references is hereby incorporated by reference in its entirety for the material contained therein.

U.S. Pat. No. 3,745,623 describes diamond tools and superpressure processes for the preparation thereof, wherein the diamond content is present either in the form of a mass comprising diamond crystals bonded to each other or of a thin skin of diamond crystals bonded to each other.

U.S. Pat. No. 4,224,380 describes a compact for tools, such as cutting, drilling and shaping tools that consists essentially of self-bonded abrasive particles.

U.S. Pat. No. 4,311,490 describes a process for preparing a composite compact wherein a mass of abrasive crystals, a mass of metal carbide, and a boding medium are subjected to a high-temperature/high pressure process for providing a composite compact.

U.S. Pat. No. 4,333,986 describes a diamond sintered compact wherein diamond crystal particles are uniformly oriented in a particular direction and the method for producing the same.

U.S. Pat. No. 4,518,659 describes a high pressure/high temperature catalyst sweep through process for making diamond and cubic boron nitride compacts that adds an intermediate metal or metal alloy.

U.S. Pat. No. 4,525,179 describes a high pressure/high temperature (HP/HT) process for making diamond or CBN compacts that includes placing partitions within the crystal mass before HP/HT processing.

U.S. Pat. No. 4,629,373 describes a polycrystalline diamond body with a plurality of faces having enhanced surface irregularities over at least a portion of at least one of the faces.

U.S. Pat. No. 4,664,705 describes a polycrystalline diamond (PCD) body with improved thermal stability which comprises a PCD body which has had at least one of its previously empty pores infiltrated by a silicon containing alloy.

U.S. Pat. No. 4,694,918 describes a percussion rock bit that comprises a steel body having a means for connection to a drill string at one end and having a plurality of inserts at the other end for crushing rock at the bottom of a hole being drilled.

U.S. Pat. No. 4,738,689 describes a polycrystalline compact of self-bonded diamond particles having a network of interconnected empty pores dispersed throughout.

U.S. Pat. No. 4,798,026 describes a thermostable abrasive diamond product that includes a compact formed of diamond grains representing more than 80% by volume of the compact, each grain being bonded directly to its neighbors so as to form a polycrystalline structure.

U.S. Pat. No. 4,871,377 describes a composite compact adapted for high-temperature uses, such as a cutter on a rotary drill bit, which includes a relatively thick table of diamond or boron nitride particles with a strong, chemically inert binder matrix and a thin metal layer bonded directly to the table in a HP/HT press.

U.S. Pat. No. 4,874,398 describes a process for producing a diamond compact having a compressive strength of at least 10 kbars.

U.S. Pat. No. 4,906,528 describes a cutting element of flat shape suitable for use as a drill tip that comprises a central abrading blade containing more than 80% vol. CBN sandwiched between two lateral support layers.

U.S. Pat. No. 4,948,388 describes a diamond compact comprised of 60-95 volume percent of diamond crystals which have been plastically deformed so that they form a rigid framework structure in which contacts between the diamond crystals occur over surfaces arising from plastic deformation of the diamond crystals during formation of the compact under pressure and temperature conditions within the graphite stability field.

U.S. Pat. No. 4,985,051 describes a diamond compact composed of 60-95 volume % diamond crystals plastically deformed into a closely packed, rigid structure with contacts between the diamond crystals over extended mating surfaces arising from the plastic deformation.

U.S. Pat. No. 5,009,673 describes a method for manufacturing a polycrystalline sandwich compact comprising a polycrystalline diamond or CBN core interposed between outer support layers.

U.S. Pat. No. 5,011,509 describes a compact blank for use in operations that require very high abrasion resistance and a thermally stable cutting edge.

U.S. Pat. No. 5,011,514 describes superabrasive cutting elements, backed compacts and methods for their manufacture wherein metal-coated superabrasive particles are cemented under HPHT conditions.

U.S. Pat. No. 5,127,923 describes an abrasive compact with a substantially solid body that is provided from a mass of abrasive particles, which are bonded together on a particle-to-particle basis.

U.S. Pat. No. 5,151,107 describes superabrasive cutting elements, backed compacts and methods for their manufacture wherein metal-coated superabrasive particles are cemented under HPHT conditions.

U.S. Pat. No. 5,266,236 describes a method for making a thermally stable, dense, electrically conductive diamond compact.

U.S. Pat. No. 5,273,557 describes rotary drill bits and blanks which retain polycrystalline diamond or CBN compacts, but which do not suffer from disadvantages attendant by prior drill designs.

U.S. Pat. No. 5,304,342 describes a sintered product useful for abrasion- and impact-resistant tools and the like, comprising an iron-group metal binder and refractory metal carbide particles, e.g. tungsten carbide, formed in situ during sintering by the exothermic reaction of a carbide-forming refractory metal powder with a carbon source mixed therewith.

U.S. Pat. No. 5,351,772 describes a substantially polycrystalline diamond compact cutting element for drilling subterranean formations.

U.S. Pat. No. 5,370,195 describes a drill bit that has a means at one end for connecting the bit to a drill string and a plurality of inserts at the other end for crushing the rock to be drilled.

U.S. Pat. No. 5,435,403 describes a cutting element having a substantially planar table of superhard material mounted on a substrate or backing.

U.S. Pat. No. 5,590,729 describes a cutting element for a rotary drill bit for subterranean drilling, including a substantially planar table of superhard material having a cutting face and a cutting edge.

U.S. Pat. No. 5,605,198 describes a drill bit employing selective placement of cutting elements engineered to accommodate differing loads such as are experienced at different locations on the bit crown.

U.S. Pat. No. 5,769,176 describes a diamond sintered compact having a higher strength as well as more excellent heat resistance, breakage resistance and corrosion resistance.

U.S. Pat. No. 5,787,022 describes a drill bit employing selective placement of cutting elements engineered to accommodate differing loads such as are experienced at different locations on the bit crown.

U.S. Pat. No. 5,959,747 describes a drill bit employing selective placement of cutting elements engineered to accommodate differing loads such as are experienced at different locations on the bit crown.

U.S. Pat. No. 5,967,249 describes a cutter for use on a rotary-type drag bit for earth boring, comprising a substantially rectangular diamond table attached to a substrate.

U.S. Pat. No. 6,021,859 describes a drill bit employing selective placement of cutting elements engineered to accommodate differing loads such as are experienced at different locations on the bit crown.

U.S. Pat. No. 6,068,913 describes a PCD/PCBN tool and method for making the same that involves the use of an intermediate layer of polycrystalline material between a substrate and an outer working layer.

U.S. Pat. No. 6,245,312 B1 describes a superhard carbon material having a structure comprising structural elements, in the form of tetrahedrons, with groups of carbon atoms in their apices.

U.S. Pat. No. 6,315,065 B1 describes a cutter element for use in a drill bit, comprising a substrate and a plurality of layers thereon.

U.S. Pat. No. 6,401,844 B1 describes a cutter comprising a superabrasive volume that includes a cutting face portion extending transversely across a leading face of a supporting substrate and a contiguous jacket portion extending rearwardly over the supporting substrate along a portion of its side periphery.

U.S. Pat. No. 6,410,085 B1 describes a method of machining a polycrystalline diamond material that includes a matrix of interstices containing a catalyzing material and volume close to a working surface thereof substantially free of catalyzing material.

U.S. Pat. No. 6,435,058 B1 describes a method for use in designing rotary drill bits that comprises determining locations in which cutters are to be provided.

U.S. Pat. No. 6,443,248 B2 describes a cutter element for use in a drill bit, comprising a substrate and a plurality of layers thereon.

U.S. Pat. No. 6,481,511 B2 describes a rotary drill bit that includes cutters arranged in a series of concentric rings.

U.S. Pat. No. 6,544,308 B2 describes a polycrystalline diamond or diamond-like element with greatly improved wear resistance without loss of impact strength.

U.S. Pat. No. 6,562,462 B2 describes a polycrystalline diamond or diamond-like element with greatly improved wear resistance without loss of impact strength.

U.S. Pat. No. 6,585,064 B2 describes an earth boring drill bit with a superhard polycrystalline diamond or diamond-like element with greatly improved resistance to thermal degradation without loss of impact strength.

U.S. Pat. No. 6,589,640 B2 describes a superhard polycrystalline diamond or diamond-like element with greatly improved resistance to thermal degradation without loss of impact strength.

U.S. Pat. No. 6,592,985 B2 describes a superhard polycrystalline diamond or diamond-like element with greatly improved resistance to thermal degradation without loss of impact strength.

U.S. Pat. No. 6,601,662 B2 describes a polycrystalline diamond or diamond-like element with greatly improved resistance to thermal degradation without loss of impact strength.

U.S. Pat. No. 6,739,214 B2 describes a method of making an earth boring drill bit having a superhard polycrystalline diamond or diamond-like element with greatly improved resistance to thermal degradation without loss of impact strength.

U.S. Pat. No. 6,749,033 B2 describes a superhard polycrystalline diamond or diamond-like element with greatly improved resistance to thermal degradation without loss of impact strength.

U.S. Pat. No. 6,861,098 B2 describes a method for forming a superhard polycrystalline diamond or diamond-like element with greatly improved resistance to thermal degradation without loss of impact strength.

U.S. Pat. No. 6,861,137 B2 describes a method for manufacturing a polycrystalline diamond or diamond-like element with greatly improved resistance to thermal degradation without loss of impact strength.

U.S. Pat. No. 6,878,447 B2 describes a superhard polycrystalline diamond or diamond-like element with greatly improved resistance to thermal degradation without loss of impact strength.

SUMMARY OF THE INVENTION

It is desirable to provide improved thermal stability in polycrystalline diamond compacts (PDC). It is particularly desirable to provide such improved stability by incorporating in the design of the PDC two or more catalytic elements, at least one of which is a thermally stable catalytic element and which is incorporated in and/or within the cutting surface.

Accordingly, it is an object of one or more embodiments of this invention to provide a PDC with two or more catalytic elements incorporated within the PDC.

It is another object of one or more embodiments of this invention to provide a PDC with a thermally stable catalytic element incorporated within the PDC.

It is a further object of one or more embodiments of this invention to provide a PDC with a thermally stable catalytic element incorporated within the region adjacent to the cutting surface of the PDC.

It is a still further object of one or more embodiments of this invention to provide a PDC with a metallic catalytic element within a first volume remote from the working surface and a second non-metallic thermally stable catalyzing material in a second volume adjacent to the working surface.

It is a further object of one or more embodiments of this invention to provide a PDC where the catalyzing element in the first volume remote from the working surface consists of a metallic material selected from elements of Group VIII of the periodic table, namely Fe, Co, Ni, Ru, Rh, Pd, Os, Ir and Pt.

It is a further object of one or more embodiments of this invention to provide a PDC where the catalyzing element in the first volume is selected from a transition metal in the group of Mn, Cr and Ta.

It is a further object of one or more embodiments of this invention to provide a PDC where the catalyzing element in the first volume is a binary system (of alloys or mixtures) where at least one component is selected from carbide formers from Groups IVB, VB, VIB of the periodic table (namely Ti, Zr, Hf, V, Nb, Mo, W) and the other component is an element from Group IB: Cu, Ag and Au.

It is a further object of one or more embodiments of this invention to provide a PDC where the catalyzing element in the second volume includes phosphorous.

It is a further object of one or more embodiments of this invention to provide a PDC where the catalyzing element in the second volume includes one or more alkali earth carbonates (one or more alkaline and alkaline earth) namely: $Li_2CO_3$; $NaCO_3$; $MgCO_3$; $CaCO_3$; $SrCO_3$; $K_2CO_3$; and the like.

It is a further object of one or more embodiments of this invention to provide a PDC where the catalyzing element in the second volume includes one or more sulfate, namely: $Na_2SO_4$; $MgSO_4$; $CaSO_4$; and the like.

It is a further object of one or more embodiments of this invention to provide a PDC where the catalyzing element in the second volume includes one or more hydroxides, namely: $Mg(OH)_2$; $Ca(OH)_2$; and the like.

It is a further object of one or more embodiments of this invention to provide a PDC where the catalyzing element in the second volume includes $WO_3$ and the like.

It is a further object of one or more embodiments of this invention to provide a PDC where the catalyzing element in the second volume includes boron or boron carbide ($B_4C$).

It is a further object of one or more embodiments of this invention to provide a PDC where the catalyzing element in the second volume includes $TiC_{0.6}$.

It is a further object of one or more embodiments of this invention to provide a PDC where the catalyzing element in the second volume includes iron oxide or double oxide, namely: $FeTiO_3$; $Fe_2SiO_4$; $Y_3Fe_5O_{12}$; and the like.

It is a further object of one or more embodiments of this invention to provide a PDC where the catalyzing element in the second volume can include a metal selected from germanium, copper or zinc, of which germanium is thermally stable.

It is a further object of one or more embodiments of this invention to provide a PDC where the catalyzing element in the second volume includes one or more buckminsterfullerenes.

It is an object of one or more embodiments of this invention to provide a method for making a polycrystalline diamond element that has a working surface, a first volume remote from the working surface that contains a metallic catalyzing material, and a second volume adjacent to the working surface that contains a non-metallic catalyzing material.

It is a still further object of one or more embodiments of this invention to provide a method for making a polycrystalline diamond element where the catalyzing element in the first volume is supplied by a substrate material in contact with the first volume during High Temperature-High Pressure sintering.

It is a still further object of one or more embodiments of this invention to provide a method for making a polycrystalline diamond element where the catalyzing element in the first volume is mixed with superhard particles prior to High Temperature-High Pressure sintering.

It is a still further object of one or more embodiments of this invention to provide a method for making a polycrystalline diamond element where the catalyzing element in the second volume is mixed with superhard particles prior to High Temperature-High Pressure sintering.

It is a still further object of one or more embodiments of this invention to provide a method for making a polycrystalline diamond element where the second volume is formed after the High Temperature-High Pressure sintering process.

It is another object of one or more embodiments of this invention to provide a process for making a polycrystalline diamond element that includes a body with a working surface, a first volume of the body remote from the working surface that contains a metallic catalyzing material and a second volume of the body adjacent to the working surface that contains a non-metallic catalyzing material, where the metallic catalyst is removed from the second volume after High Temperature-High Pressure sintering and where the non-metallic catalyst is inserted into the interstitial spaces between the bonded superhard particles.

It is a further object of one or more embodiments of this invention to provide a process for making a polycrystalline diamond element where the metallic catalyzing material is removed from the second volume by leaching.

It is a further object of one or more embodiments of this invention to provide a process for making a polycrystalline diamond element where the metallic catalyzing material is removed from the second volume by electrical discharge.

It is a further object of one or more embodiments of this invention to provide a process for making a polycrystalline diamond element where the metallic catalyzing material is removed from the second volume by mechanical means.

It is a further object of one or more embodiments of this invention to provide a process for making a polycrystalline diamond element where the non-metallic catalyzing material is reintroduced in an oven cycle.

It is a further object of one or more embodiments of this invention to provide a process for making a polycrystalline diamond element where the non-metallic catalyzing material is reintroduced in a second High Temperature-High Pressure process step.

It is a further object of one or more embodiments of this invention to provide a process for making a polycrystalline diamond element where the non-metallic catalyzing material is reintroduced by a solvent.

It is a further object of one or more embodiments of this invention to provide a process for making a polycrystalline diamond element where the non-metallic catalyst is a material reintroduced by a gas phase/plasma technique.

It is a further object of one or more embodiments of this invention to provide a process for making a polycrystalline diamond element where the non-metallic catalyst is a material that is reintroduced by a vacuum melt technique.

BRIEF DESCRIPTION OF THE DRAWINGS

The accompanying drawings incorporated in and forming a part of the specification, illustrate present preferred embodiment(s) of the invention known to the inventors. Some, although not all, alternative embodiments are described in the following description.

In the drawings.

Reference will now be made in detail to the present preferred embodiment(s) of the invention, an example of which is illustrated in the accompanying drawings.

DETAILED DESCRIPTION OF THE INVENTION

The polycrystalline diamond compact (PDC) of this invention is manufactured so as to incorporate two or more different catalytic elements. A traditional metallic catalytic element is used in a region or volume of the polycrystalline diamond layer adjacent to the cemented carbide substrate. Generally, this metallic catalyst is readily supplied by the substrate during the high temperature/high pressure (HT/HP) sintering process step, where a strong metallurgical bond is created between the polycrystalline diamond layer and the substrate. One of the important and novel features of this invention is the incorporation and use of a thermally stable non-metallic catalytic element in the region or volume of the polycrystalline diamond layer adjacent to the working or cutting surface, in addition to the metallic catalyst provided in the volume of the polycrystalline diamond layer adjacent to the cemented carbide substrate. For the purposes of this disclosure, polycrystalline diamond should be considered as both commonly known diamond in a polycrystalline form and cubic boron nitride in a polycrystalline form. Also, typically the substrate region or volume is composed of a cemented tungsten carbide composition, also referred to as WC.

Figure 1:
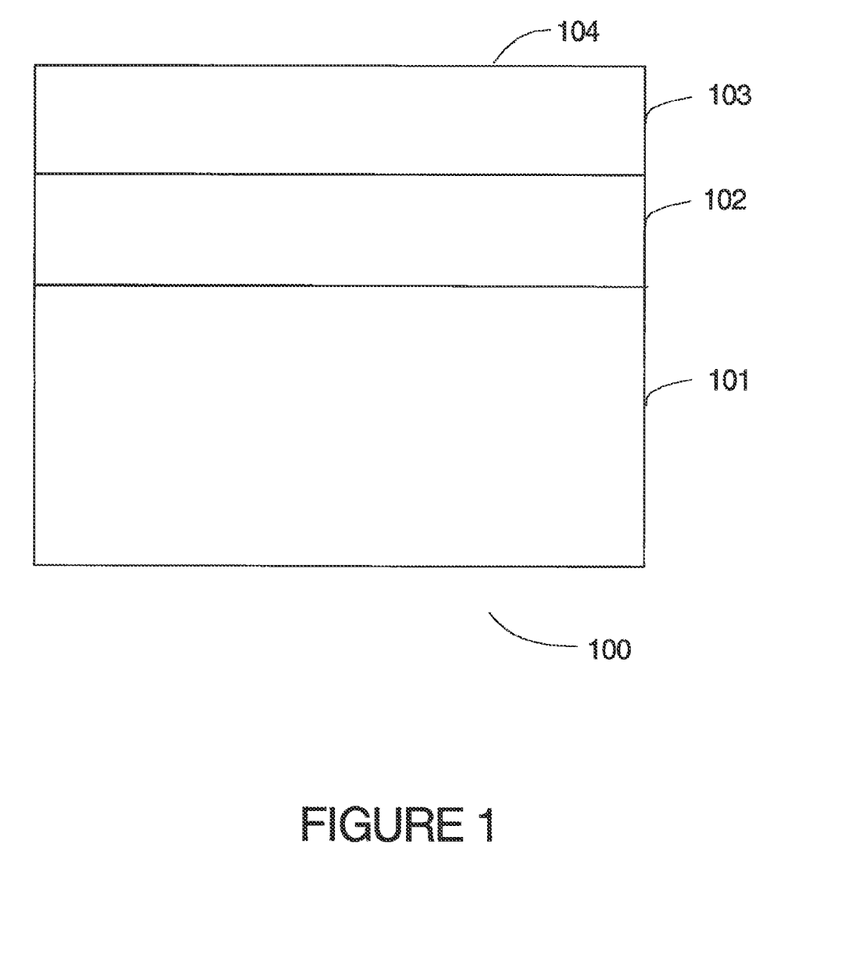
FIG. 1 is a section view of a compact of this invention.

FIG. 1 shows a cross-section view representation of the compact 101 of this invention with the three designated regions: namely the substrate region 101; the first polycrystalline diamond layer 102; and the second polycrystalline diamond layer 103. The working or cutting surface 104 is shown along the top and side of the second polycrystalline diamond layer 103. The first polycrystalline diamond layer 102 is shown adjacent to the substrate 101 and remote from the working surface 104. During manufacturing, the sintering using a high temperature/high pressure (HT/HP) press causes a metallic catalytic element, typically cobalt, in the substrate to dissolve or liquefy and then to sweep through the diamond layer 102 thereby providing for the growth of sintered diamond bonds between the diamond grains of the polycrystalline diamond and forming a solid compact of the substrate and the polycrystalline diamond layer 102. The catalytic elements typically used in the sintering are generally the same catalytic elements necessary for the conversion of graphite to diamond in the high temperature/high pressure (HT/HP) process. Most often metallic elements from Group VIII (primarily Fe, Ni and/or Co) in the periodic table are used for this sintering process, although other metallic catalysts can be used with or substituted for the sintering catalyst without departing from the concept of this invention. These alternative metallic catalysts include, but are not necessarily limited to, Group VIII elements, namely: Fe, Co, Ni, Ru, Rh, Pd, Os, Ir and Pd;

Transition metals, namely: Mn, Cr and Ta; and Carbide formers from Groups IVB, VB, VIB, namely: Ti, Zr, Hf, V, Nb, Mo and W, alloyed with Group IB elements, namely: Cu, Ag and Au. These metallic catalysts (primarily Fe, Ni and/or Co) are convenient for the manufacture of PDCs because they are commonly used as binders in cemented tungsten carbide, thus the catalytic element necessary for the PCD sintering process is naturally supplied by the substrate during the HT/HP processing, and these metallic catalyst materials tend to form a continuous metallurgical bond between the PCD layer and the substrate, thereby greatly increasing the strength of the resulting PDC tool. However, these metallic catalyzing elements are not generally considered to be thermally stable and they generally lead to early failure of the compact in high temperature use because of their relatively high coefficients of thermal expansion and their propensity to readily dissolve carbon from diamond at elevated temperatures. It may also be possible to sinter directly with the non-metallic catalysts, in alternative embodiments of this invention.

Recent discoveries have brought to light the existence of non-metallic catalytic elements, which have been shown to promote the conversion of graphite to diamond at high temperature/high pressure and are therefore suitable for a HT/HP sintering process step for the production of PCD. These non-metallic catalytic materials include, but are not necessarily limited to, the following: phosphorous; carbonates, including: $Li_2CO_3$, $Na_2CO_3$, $MgCO_3$, $CaCO_3$, $SrCO_3$ and $K_2CO_3$; sulfates, including: $Na_2SO_4$, $MgSO_4$ and $CaSO_4$; hydroxides, including: $Mg(OH)_2$ and $Ca(OH)_2$; $WO_3$; boron compounds, including: B and $B_4C$, $TiC_{0.6}$, Iron oxide and/or double oxide, including: $FeTiO_3$, $Fe_2SiO_4$, $Y_3Fe_5O_{12}$ and the like; copper; zinc; germanium; and Buckminsterfullerenes (also known as fullerenes, buckyballs and the like). These elements are generally considered to be thermally stable because they have low coefficients of thermal expansion and do not dissolve carbon from the diamond particles.

Because of their superior thermal stability, these non=metallic catalytic materials are incorporated into the diamond layer 103 of the compact 101 of this invention. The non-metallic catalytic materials provide for the growth of sintered diamond bonds between the diamond grains of the polycrystalline diamond of layer 103 and also form a strong bond with diamond layer 102. By incorporating one or more of these non-metallic catalyzing materials in to the working surface 104 region, which includes both the top and sidewalls of the second polycrystalline layer 103, the resulting PDC compact can provide a more thermally stable cutting edge in use in high temperature contact with a rock or otherwise formation. The diamond particles of the second diamond layer 103 remain integrally bonded with the diamond particles of the first diamond layer 102, which in turn remains strongly bonded to the substrate via the metallic catalyst in the first diamond layer 102.

Figure 2:
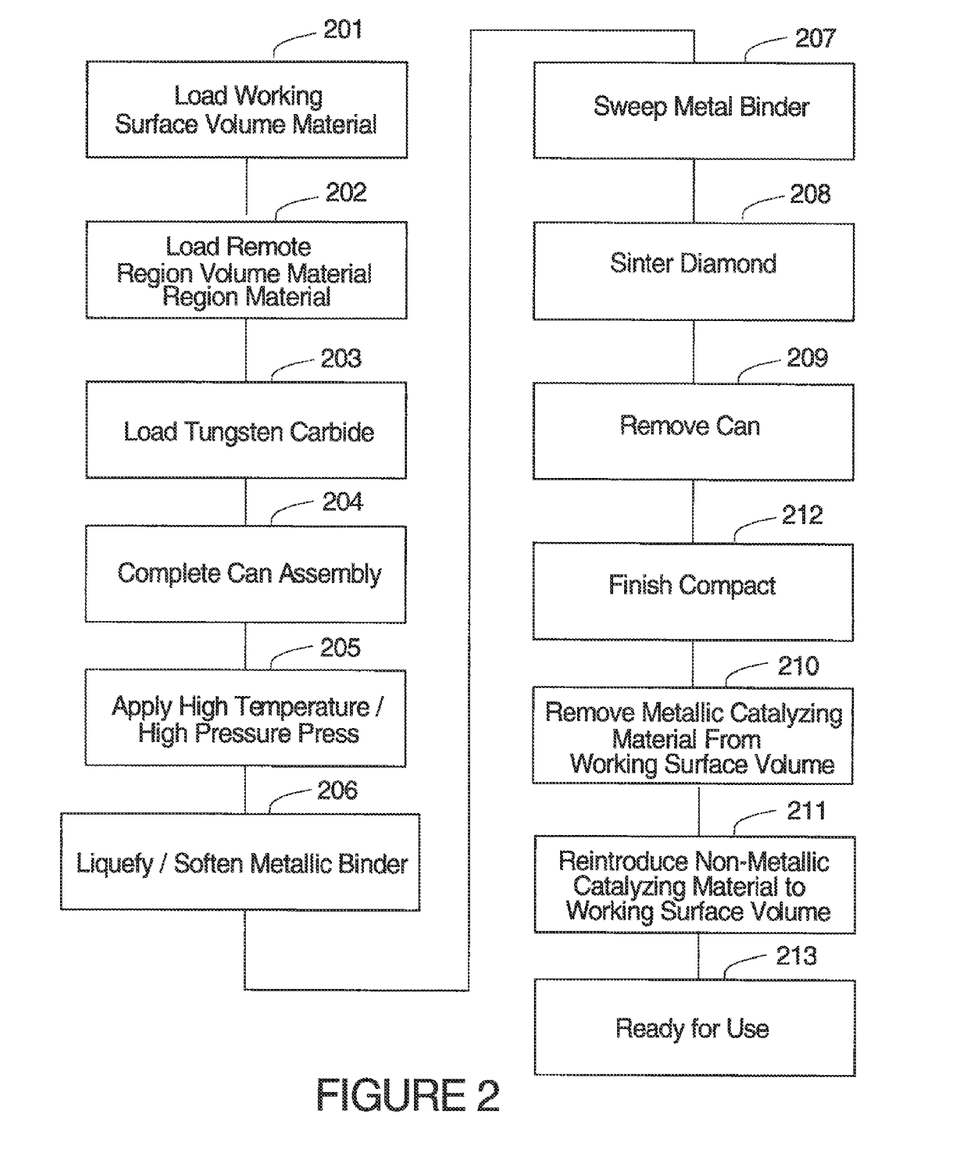
FIG. 2 is a processing flow chart of the processing or method steps of the manufacture of the compact of this invention.

FIG. 2 shows the present mode of making or manufacturing the PDC of this invention. The working surface polycrystalline diamond material is loaded 201, typically in a can device arrangement for HT/HP processing. The remote working surface polycrystalline diamond material is loaded 202, also typically in the can device arrangement for HT/HP processing. In some alternative embodiments, the material for both polycrystalline diamond layers 102, 103 may be loaded together, while in other embodiments, because of the different characteristics of the desired catalysts, they may be loaded in separate steps and may be separated in different can components. The substrate material, typically tungsten carbide (WC) is loaded 203, also typically in the can device arrangement. The can device is completed 204, typically by assembling the various components along with potentially other can components as desired for shaping and structural support. The completed can device is then subjected to high temperature-high pressure processing 205 sufficient to liquefy and/or soften 206 the metal binder in the substrate material and to cause this metal binder to sweep 207 through the polycrystalline diamond layers 102, 103 thereby sintering 208 the diamond crystals of the polycrystalline diamond layers 102, 103 to the substrate 101. The can is removed 209. The compact is finished 212, typically by grinding, shaping, beveling, and polishing as desired. The metallic catalyzing material is removed 210 from the working surface 104 and the second polycrystalline diamond layer 103. Typically, this removal 210 is accomplished by leaching, although electrical discharge and mechanical metallic removal techniques can be substituted without departing from the concept of this invention. Non-metallic catalyzing material is reintroduced 211 to the working surface 104 and the second polycrystalline diamond layer 103. Typically, this non-metallic catalyst reintroduction is accomplished by introducing the non-metallic material through a solvent re-precipitation processing step, although alternative processing to reintroduce the non-metallic catalytic material can involve a second HT/HP process, an oven cycle, use of a gas phase or plasma and/or a vacuum melt process without departing from the concept of this invention. At which point the compact is ready for use 213.

Figure 3:
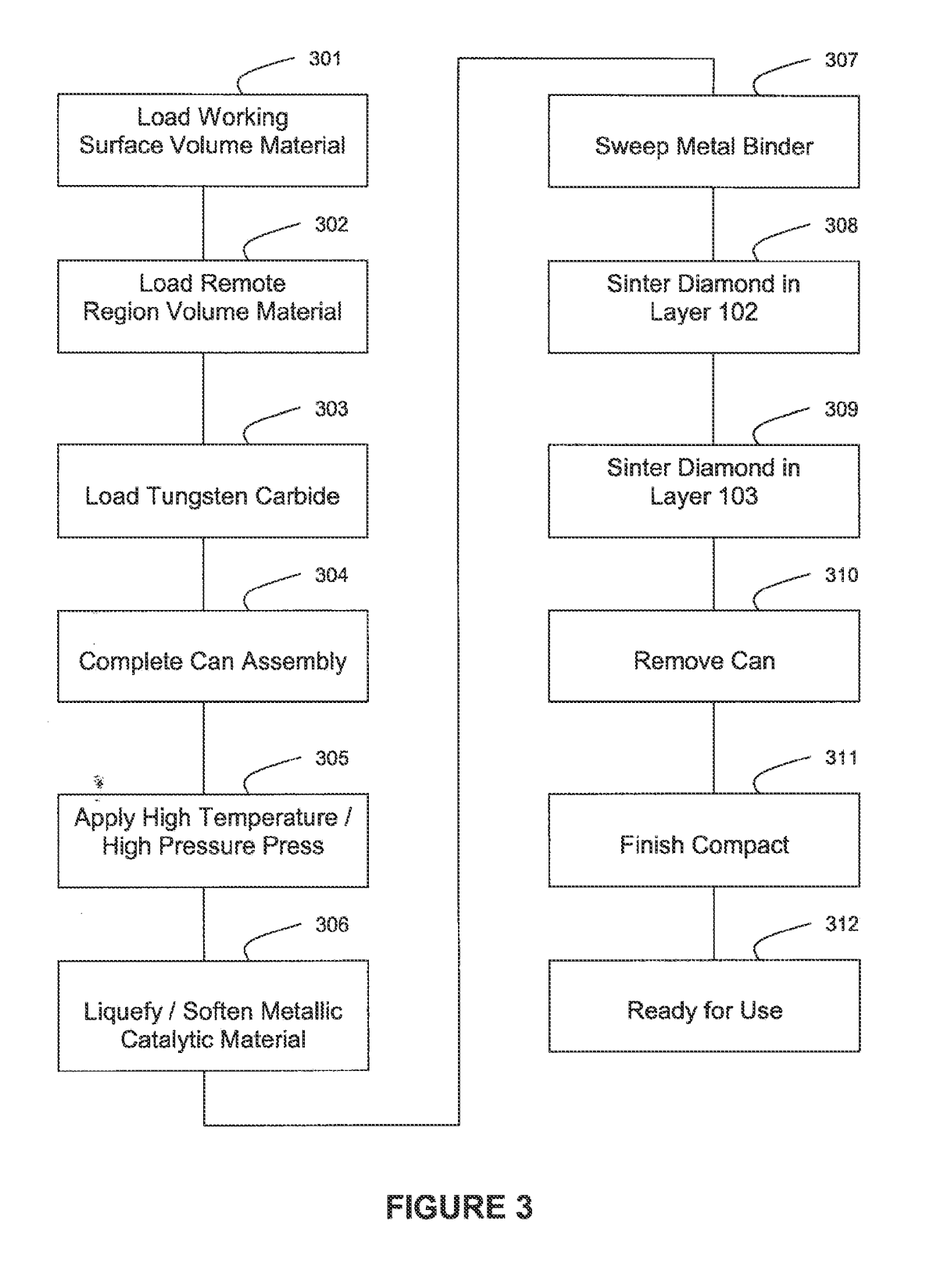
FIG. 3 is a processing flow chart of and alternative of the processing or method steps of the manufacture of the compact of this invention.

FIG. 3 shows an alternative mode of making or manufacturing the PDC of this invention. The working surface polycrystalline diamond material is loaded 301, typically in a can device arrangement for HT/HP processing. The loaded material when processed forms a region that contains a non-metallic catalytic element, in the range of 1% to 20% by weight, premixed with the diamond material. The remote working surface polycrystalline diamond material is loaded 302, also typically in a can device arrangement for HT/HP processing. The substrate material, typically tungsten carbide (WC) is loaded 303, also typically in a can device arrangement. The can device is completed 304, typically by assembling the various components along with potentially other can components as desired for shaping and structural support. The completed can device is then subjected to high temperature-high pressure processing 305 sufficient to liquefy and/or soften 306 the metallic catalytic element in the substrate material and to cause this metallic catalytic element to sweep 307 through the polycrystalline diamond layer 102, thereby sintering 308 the diamond crystals of the polycrystalline diamond layer 102 to the substrate 101. The metallic catalytic element is prevented from sweeping through the diamond layer 103 by the inclusion in the diamond layer region of the non-metallic catalytic material. The high temperature-high pressure processing 305 is then modified to enable sintering 309 of the polycrystalline diamond layer 103 by the non metallic catalytic material mixed therein. The polycrystalline diamond layer 103 is thereby sintered to layer 102. The can is removed 310. The compact is finished 311, typically by grinding, shaping, beveling and polishing as desired. At which point the compact is ready for use 312.

Alternatively, metallic catalyzing material(s) can be used to sinter the entire polycrystalline diamond table, including both layers 102 and 103. The metallic catalyzing material will then sweep from the substrate 101 or be mixed with the diamond layers 102, 103 or any combination thereof. After the sintering step is completed, the metallic catalyzing material is removed from the second polycrystalline diamond layer 103, including the areas of the compact adjacent to the working surface 104. A variety of techniques are employed to remove this metallic catalyzing material as previously described in relation to FIG. 2. After removal of the metallic catalyzing material from the second polycrystalline diamond layer 103, one or more non-metallic catalyzing materials or elements are reintroduced to the working surface 104 and the second polycrystalline diamond layer 103. Again, the present techniques for reintroduction of the catalyzing materials are described in relation to FIG. 2.

Figure 4:
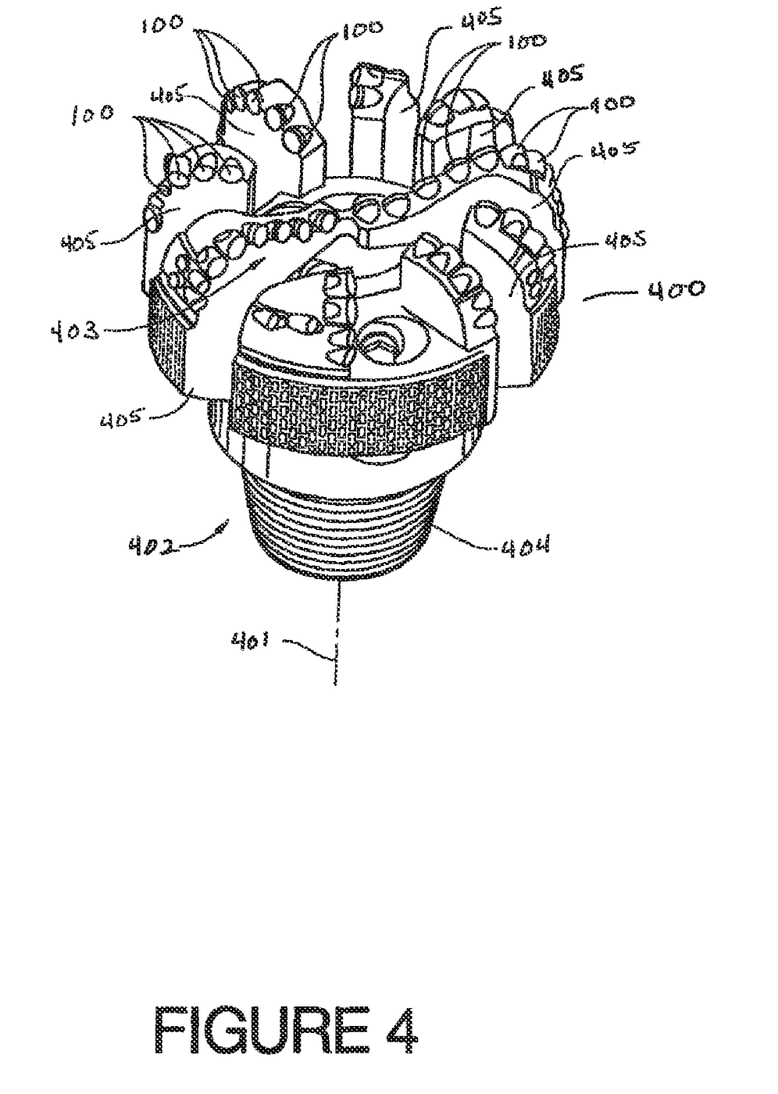
FIG. 4 shows a representative bit employing the compacts of this invention.

FIG. 4 shows a typical drill bit 400 with the compacts 100 of this invention incorporated therein. The fixed cutter drill bit 400 of this FIG. 4 comprises a bit body 402 having a leading face 403 and a shank 404 to permit the drill bit 400 to be secured to the remainder of a drill string (not shown). The bit body 402 is intended to be rotated, in use, about an axis of rotation 401. Upstanding from the leading face 403 are a plurality of blades 405 upon which a plurality of compacts or cutters 100 are mounted.

In alternative embodiments of the invention, a combination of one or more of the features of the foregoing PDC devices should be considered within the scope of this invention. Moreover, in alternative embodiments the various enumerated steps of the manufacturing process of the PDC devices of this invention can be performed in various and different orders, with some steps combined and other steps added without departing from the concept of this invention. The appended claims are to define the scope of this invention. All process and devices that come within the meaning and range of equivalency of the claims are to be embraced as being within the scope of this patent.

What is claimed is:

1. A polycrystalline diamond compact, comprising:
    a substrate;
    a body having a working surface, wherein the body includes a first volume remote from the working surface attached to the substrate and a second volume including the working surface attached to the first volume, wherein the first volume contains a metallic catalyzing material and wherein the second volume contains a carbonate material.

2. The polycrystalline diamond compact of claim 1, wherein the second volume contains an alkaline material.

3. The polycrystalline diamond compact of claim 1, wherein the carbonate material includes an alkaline earth carbonate material.

4. The polycrystalline diamond compact of claim 1, wherein the carbonate material includes a material selected from the group consisting of $Li_2CO_3$, $Na_2CO_3$, $MgCO_3$, $CaCO_3$, $SrCO_3$ and $K_2CO_3$.

5. The polycrystalline diamond compact of claim 1, wherein the metallic catalyzing material of the first volume includes one or more metallic elements from Group VIII of the periodic table.

6. The polycrystalline diamond compact of claim 1, wherein the metallic catalyzing material of the first volume comprises cobalt.

7. The polycrystalline diamond compact of claim 1, wherein the metallic catalyzing material of the first volume includes at least one transition metal selected from the group consisting of Mn, Cr and Ta.

8. The polycrystalline diamond compact of claim 6, wherein the working surface includes an upper surface of the body remote from the substrate.

9. The polycrystalline diamond compact of claim 8, wherein the working surface includes a side surface of the body.

10. The polycrystalline diamond compact of claim 9, wherein the carbonate material includes a material selected from the group consisting of $Li_2CO_3$, $Na_2CO_3$, $MgCO_3$, $CaCO_3$, $SrCO_3$ and $K_2CO_3$.

11. The polycrystalline diamond compact of claim 1, wherein the metallic catalyzing material of the first volume includes an alloy of a carbide forming material selected from the group of materials consisting of Group IVB, Group VB and Group VIB materials, and a material selected from the group consisting of Group IB materials.

12. A method of making a polycrystalline diamond compact, the method comprising:
    providing a mass of polycrystalline diamond material and a substrate material;
    applying a high temperature-high pressure press to the mass of polycrystalline diamond material and the substrate material;
    sintering the polycrystalline diamond material;
    defining a first volume of the sintered polycrystalline diamond material such that the defined first volume is remote from a working surface and contains a metallic catalyzing material; and
    defining a second volume of the sintered polycrystalline diamond material adjacent to the working surface such that the defined second volume contains a carbonate material.

13. The method of claim 12, wherein the catalyzing element in the first volume is mixed with superhard diamond particles prior to application of the high temperature-high pressure press.

14. The method of claim 12, wherein the carbonate material in the second volume is mixed with superhard diamond particles prior to application of the high temperature-high pressure press.

15. The method of claim 12, wherein the carbonate material is added to the second volume after application of the high temperature-high pressure press.

16. The method of claim 12, wherein defining a second volume includes defining the second volume to include an alkaline material.

17. The method of claim 12, wherein defining a second volume includes defining the second volume to include an alkaline earth carbonate material.

18. The method of claim 12, wherein the carbonate material includes a material selected from the group consisting of $Li_2CO_3$, $Na_2CO_3$, $MgCO_3$, $CaCO_3$, $SrCO_3$ and $K_2CO_3$.

19. The method of claim 12, wherein the metallic catalyzing material of the first volume comprises cobalt.

20. The method of claim 19, further comprising defining the working surface to include an upper surface remote from the substrate.

21. The method of claim 20, further comprising defining the working surface to include a side surface of the sintered polycrystalline diamond material.

22. The polycrystalline diamond compact of claim 21, wherein the carbonate material includes a material selected from the group consisting of $Li_2CO_3$, $Na_2CO_3$, $MgCO_3$, $CaCO_3$, $SrCO_3$ and $K_2CO_3$.

23. A drill bit, comprising:
    a shank, for securing the drill bit to a drill string; and
    a bit body attached to the shank, the bit body further comprising:
        a leading face, with a plurality of blades extending therefrom, and a plurality of compacts mounted on the plurality of blades,
    wherein one or more of the plurality of compacts further comprise:

a polycrystalline diamond compact, comprising:
  a substrate;
  a body having a working surface, wherein the body includes a first volume remote from the working surface attached to the substrate and a second volume including the working surface attached to the first volume, wherein the first volume contains a metallic catalyzing material and wherein the second volume contains a carbonate material.

24. The drill bit of claim 23, wherein the second volume contains an alkaline material.

25. The drill bit of claim 23, wherein the carbonate material includes an alkaline earth carbonate material.

26. The drill bit of claim 23, wherein the carbonate material includes a material selected from the group consisting of $Li_2CO_3$, $Na_2CO_3$, $MgCO_3$, $CaCO_3$, $SrCO_3$ and $K_2CO_3$.

27. The drill bit of claim 23, wherein the metallic catalyzing material of the first volume includes one or more metallic elements from Group VIII of the periodic table.

28. The drill bit of claim 23, wherein the metallic catalyzing material of the first volume comprises cobalt.

29. The drill bit of claim 28, wherein the working surface includes an upper surface of the body remote from the substrate.

30. The drill bit of claim 29, wherein the working surface includes a side surface of the body.

31. The drill bit of claim 23, wherein the metallic catalyzing material of the first volume includes at least one transition metal selected from the group consisting of Mn, Cr and Ta.

32. The drill bit of claim 23, wherein the metallic catalyzing material of the first volume includes an alloy of a carbide forming material selected from the group of materials consisting of Group IVB, Group VB and Group VIB materials, and a material selected from the group consisting of Group IB materials.

* * * * *